3,019,928
SPARE TIRE CARRIER FOR PICKUP TRUCKS
Marvelle W. Mullins, 1000 W. Main St., Henderson, Tex.
Filed Aug. 12, 1958, Ser. No. 754,545
2 Claims. (Cl. 214—451)

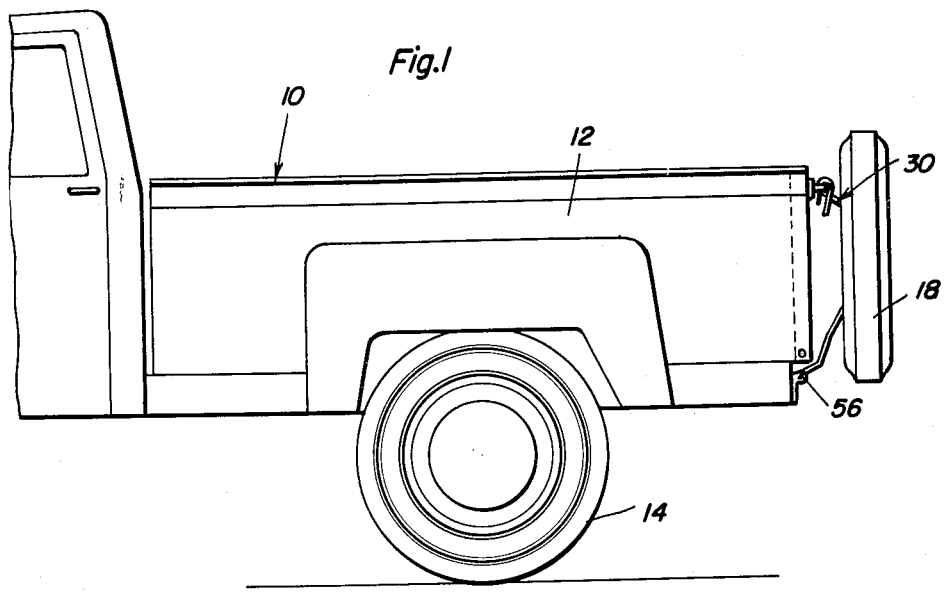
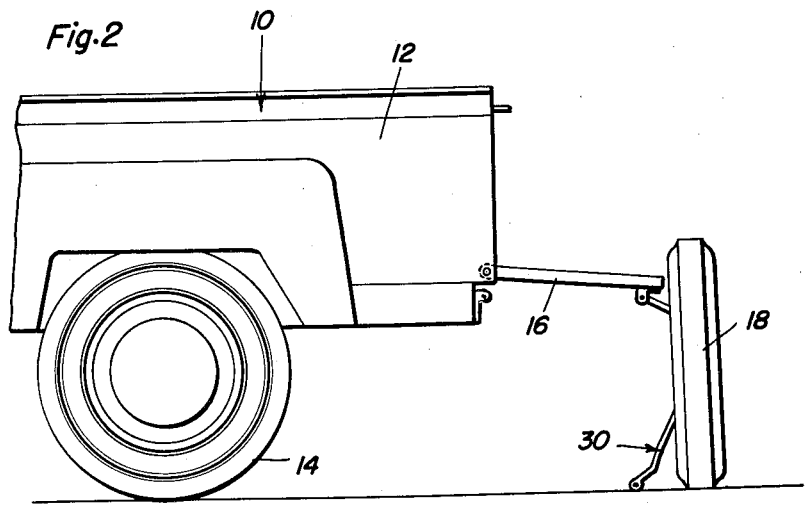

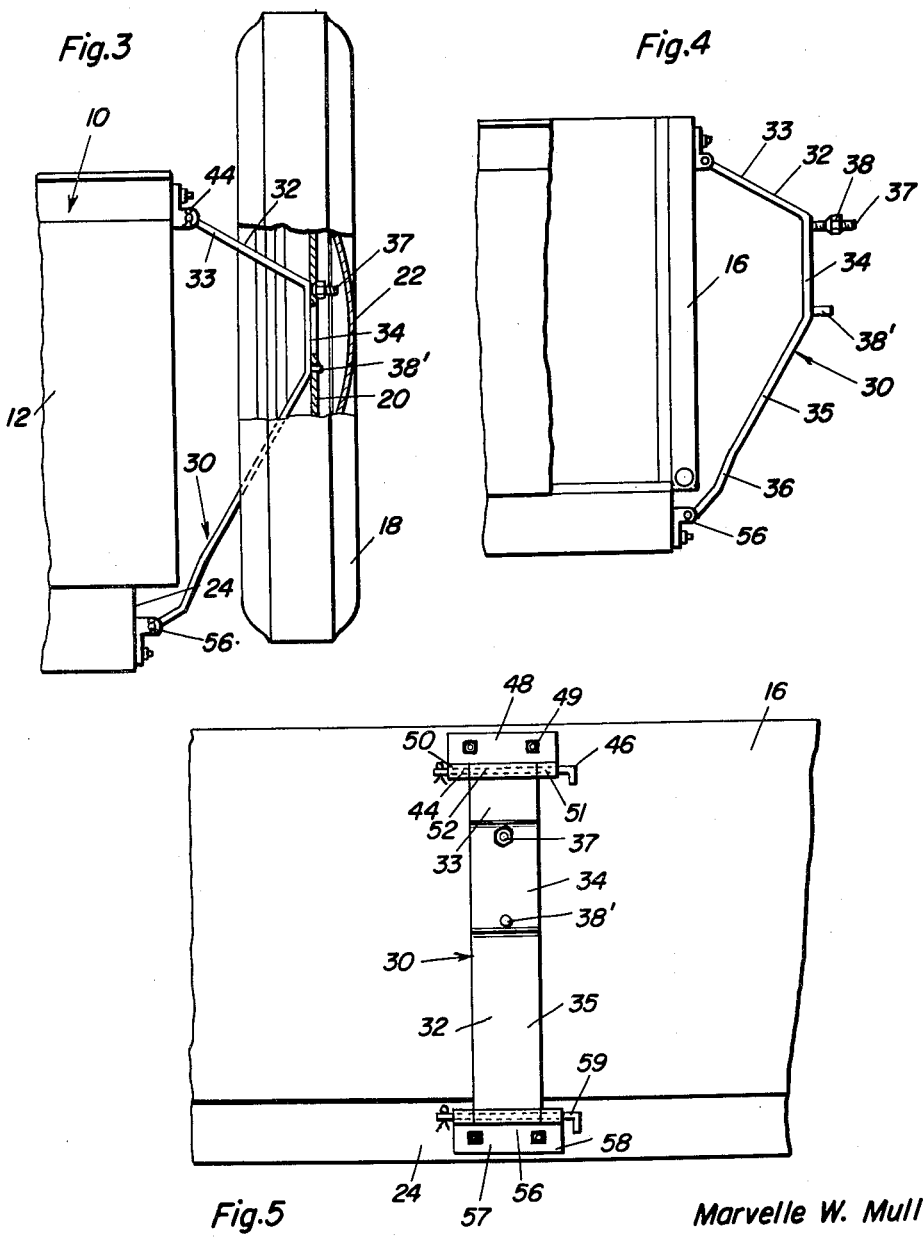

This invention relates to a spare tire carrier for all pickup trucks.

An object of the invention is to provide a spare tire carrier for pickup trucks which eliminates the necessity of carrying the spare tire beneath the truck or in the truck body, this being objectionable by most pickup truck owners or users.

The invention is embodied in a carrier which is hingedly connected to the tail gate of a pickup truck and arranged to enable the tire to be swung away from the lower edge of the tail gate and to an approximately vertical position when the tail gate is in the full open orientation.

This invention differs from ordinary tire carriers for trucks and automobiles in that the carrier is connected with a tail gate, near the upper edge thereof, and to the rear body plate. Several advantages are achieved by this arrangement. With the spare tire carried in the back of the pickup truck, it does not rob space from within the body of the truck, and the spare tire is not in an inaccessible position beneath the body of the truck, these being the two commonly used places for storage of the spare tire. Secondly, when the carrier is connected in place and the tail gate in the closed position, the carrier forms an additional lock preventing the tail gate from opening. This is a safety feature for the pickup truck, although possible it not being the present intention to have the tire carrier as a complete substitute for the ordinary chain locks at the corners of the tail gate. Finally, when in the open position, the carrier holding the tire approximately vertical, functions as a stop for the tailgate, keeping it approximately horizontal. Here again, this carrier is not intended to be a complete substitute for the chain locks at the sides of the tail gate, but can be used interchangeably therewith or as a safety feature therefor, or to provide additional strength in special instances.

A carrier constructed in accordance with the invention is made exceedingly simple, from a mechanical standpoint. The carrier is embodied in a one-piece frame connected by a hinge at its upper end to the upper edge portion of the tail gate and connected by another hinge at its lower end to the rear body plate of the truck, with both hinges having removable hinge pins so that the carrier can be completely separated if found necessary or desirable; can be disconnected at its lower end or disconnected at its upper end for various purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side view of a part of a standard pickup truck having a spare tire carrier at the rear end thereof.

FIGURE 2 is a fragmentary elevational view of the truck in FIGURE 1 but showing the tail gate in use and one possible position of the tire and tire carrier when the tail gate is in an open position.

FIGURE 3 is an enlarged fragmentary elevational view of the spare tire and carrier, parts broken away in section.

FIGURE 4 is a fragmentary elevational view of a rear part of a pickup truck, showing the carrier with the tire removed.

FIGURE 5 is a fragmentary end view of the tail gate showing the carrier without the spare tire wheel.

In the accompanying drawings there is a conventional pickup truck 10 having a truck body 12, rear wheels 14 and a tail gate 16, all of which are conventional parts of the pickup truck. Spare tire 18, wheel 20 and wheel cover 22 are also absolutely conventional and unaltered in their construction. However, the location of the spare tire and wheel differs from ordinary practice in that the spare tire is mounted at the back of the pickup truck body and namely, on the tail gate and the rear body plate 24. Although some other part of the truck may be selected for the rear lower mounting of carrier 30, the rear body plate 24 is handy and sufficiently strong to serve the purpose.

Carrier 30 is made of a one-piece frame or bar 32 having an upper part 33 of substantial width and angled with respect to the intermediate part 34. The lower part 35 of the frame extends from intermediate part 34 at an angle, there being a slight offset 36 near the lower extremity of part 35 in order to clear the lower hinge of tail gate 16. The carrier frame 32 is preferably made of flat metal stock, although web frames and the like built up of angles or other structural framing may be used, should one so desire. By far, the flat metal stock is most practical due to economy of production.

Intermediate part 34 is practically vertical when the tail gate is in the closed position although, here again, this may be tilted slightly in one direction or the other for appearance sake. One or more lugs 37 are fixed to the intermediate part 34 and are adapted to pass through holes in the wheel 20. A nut 38 is on each lug to attach the wheel firmly in place. Centering pin 38' is also fixed to the intermediate part 34 and is adapted to pass through another hole in the wheel 20. The actual fastening of the wheel to the frame 32 is very much the same as fastening a wheel to the brake drum of a motor vehicle.

There are means for attaching the upper end of frame 32 to the upper portion of tail gate 16. These means are preferably a hinge 44 with a removable hinge pin 46. The hinge 44 (FIGURE 5) has a mounting plate 48 bolted as at 49 or otherwise fastened to the tail gate 16 near the upper edge thereof and the transverse center line of the tail gate. There are two spaced hinge butts 50 and 51 on one edge of the mounting plate 48, and a hinge butt 52 adapted to fit between the butts 50 and 51. The hinge butt 52 is formed at the upper end of the angulated part 33 of the frame 32, and hinge pin 46 is removably disposed in the three hinge butts. Lower hinge 56 is identical to hinge 54 with the only difference being that the fixed part 57 of the hinge including a mounting plate 58, is bolted or otherwise fastened securely to the rear body plate 24. The hinge pin 59 of hinge 56 is passed through aligned hinge butts on mounting plate 58 and on the part 35 of frame 32.

As shown in FIGURE 1, the normal carrying position of the spare tire and wheel is at the back of the pickup truck. When it is desired to open the tail gate 16, the lower hinge pin 59 may be separated from the hinge 56 and the tail gate lowered in the ordinary way. The tire supporting frame 32 is hingedly moved about the hinge axis established by hinge pin 46 so that the tire and wheel form a leg or support for the tail gate. The invention provides the option of separating the hinge pin 46 from hinge 44 to lower the tail gate, and this would mean that the carrier becomes completely disconnected from the tail gate and with the spare tire and wheel, is swung to an out-of-the-way position beneath the truck enabling the tail gate to function just as though the spare tire and wheel and the carrier are non-existent. When the carrier is in the normal position (FIGURES 1 and 3) note that the carrier forms an additional lock by being fastened to the tail gate and the rear body plate of the truck.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a motor vehicle body including a vertically swingable tailgate having its lower end hingedly secured to the rear end portion of said body, and a spare wheel and tire carrier including an angulated, generally vertical bar comprising an intermediate portion and divergent end portions, means for removably securing a spare wheel on said intermediate portion, and means selectively hingedly and detachably securing the ends of said bar to the free end portion of the outside of the closed tailgate and to the body at a point below said tailgate, said bar being vertically engageable with the ground for supporting the tail gate in a generally horizontal open position and to facilitate the mounting thereon or removal therefrom of the spare wheel.

2. In combination, a motor vehicle body including a vertically swingable tailgate pivotally secured at its lower end on said body, and a spare wheel and tire carrier comprising a substantially vertical bar, means for securing a spare wheel on an intermediate portion of said bar, and means selectively hingedly and detachably securing the ends of the bar to the body below the tailgate and to the free end of said tailgate on the outside thereof whereby said bar with the wheel thereon may be pivotally suspended from the tailgate and swung downwardly therewith into a vertical ground engaging position for supporting said tailgate in a generally horizontal open position and to facilitate mounting the spare wheel on said bar and its removal therefrom or, alternatively, detached from the tailgate and swung downwardly on the body independently of said tailgate and to a position out-of-the-way thereof.

References Cited in the file of this patent

UNITED STATES PATENTS

| | | |
|---|---|---|
| 1,926,350 | Olson | Sept. 12, 1933 |
| 2,246,813 | Preston | June 24, 1941 |
| 2,320,856 | Ehlers | June 1, 1943 |
| 2,819,004 | Kubik et al. | Jan. 7, 1958 |

FOREIGN PATENTS

| | | |
|---|---|---|
| 1,081,840 | France | June 16, 1954 |